United States Patent [19]
Shapiro

[11] 3,812,564
[45] May 28, 1974

[54] METHOD OF MANUFACTURING A HELICAL CONVEYOR FOR A CENTRIFUGE

[75] Inventor: Leonard Shapiro, Upper Darby, Pa.

[73] Assignee: Pennwalt Corporation, Philadelphia, Pa.

[22] Filed: July 26, 1972

[21] Appl. No.: 275,375

[52] U.S. Cl............................................ 29/156.8 R
[51] Int. Cl............................................ B23p 15/00
[58] Field of Search............. 29/156.8 R, 157.3 AH; 233/7; 198/213; 72/379

[56] References Cited
UNITED STATES PATENTS

| | | |
|---|---|---|
| 1,217,537 | 2/1917 | Turney.......................... 29/157.3 AH |
| 2,440,698 | 5/1948 | Patterson.................... 29/156.8 R X |
| 2,815,790 | 12/1957 | Mayrath................................ 72/379 |
| 2,939,506 | 6/1960 | Moore............................ 198/213 X |
| 3,494,542 | 2/1970 | Craig et al............................. 233/7 |

Primary Examiner—Roy Lake
Assistant Examiner—J. W. Davie
Attorney, Agent, or Firm—Edward A. Sayer, Esq.

[57] ABSTRACT

The inner periphery of a given helical coil is machined (while the coil is at zero pitch) to a dimension which will decrease to the diameter of a given shaft when the coil is stretched to a predetermined pitch, and then the machined coil is welded to the shaft at that pitch.

7 Claims, 13 Drawing Figures

PATENTED MAY 28 1974  3,812,564

METHOD OF MANUFACTURING A HELICAL CONVEYOR FOR A CENTRIFUGE

BACKGROUND OF THE INVENTION

Centrifuges of the general type disclosed in U.S. Pat. No. 3,428,246 are utilized for separating solids from liquid. These centrifuges have helical conveyors mounted within a bowl for conveying separated solids toward solids discharge openings located at one end of the bowl. During operation of such a centrifuge, the conveyor and bowl rotate at very high speeds (several thousand RPM), but slightly different speeds (1 to 200 RPM), thus subjecting both to very high centrifugal forces.

The conveyor is comprised of helical segments welded to a shaft and to each other to form a helical coil around the shaft. In order for the conveyor to operate efficiently inside the bowl, the helix angle of the coil should be as uniform as possible, and the sides of the coil should be relatively smooth as compared to the inner annular surface of the bowl so that the separated solids will rotate with the bowl, and not with the conveyor. In other words, for efficient conveyor operation, the separated solids must slide with respect to the sides of the conveyor, but not with respect to the inner annular surface of the bowl.

The conventional method of manufacturing a conveyor for a centrifuge requires that cut discs (slit along one radius), be placed over a shaft; the individual discs are then axially displaced on the shaft to the desired pitch, and welded to the shaft and to each other to form a continuous helical coil on the shaft. As far as is known, this method has always been used by everyone in the industry for manufacturing helical conveyors for centrifuges. FIGS. 1 and 2 illustrate the problems resulting from this conventional method of manufacturing the conveyor.

Because the discs must be welded to each other to form a continuous coil, the resulting welds (seams) must be ground or otherwise smoothed after the welding operation. In addition to the welds themselves, the welding operation causes bumps to form at the location of the welds which results in changing the helix angle of the coil. Referring to FIG. 2, the welds are indicated at A, and the bumps at B. It can be seen that the helix angle $\alpha$, which is the arc tangent average pitch divided by the circumference of a single turn of the coil, has been changed to $\theta$ at the location of the bump B. These bumps B must also be ground after the welding operation. Even so, the new helix angle $\theta$ created by the bumps results in less efficient operation of the conveyor. Also, when utilizing this method, the manufacturing costs in materials and fabrication are quite high.

Continuous helical coils which are not to be used in centrifuges are conventionally manufactured in several ways. The first way is to edge roll a length of bar stock having a rectangular cross section between three rollers so as to bend the stock the "hard way."

The second way is to attach the bar stock to the mandrel of a lathe, and wind the bar stock while pulling it through guides.

The third way is to non-uniformly compress the sides of the bar stock by passing the bar stock between rollers, thus producing a coil which is thinner at the outer periphery than at the inner periphery.

As stated above, coils manufactured in any of these three ways, are conventionally used for the manufacture of helical conveyors which are not to be used in centrifuges. The pitches of such conveyors are not as critical as those which are to be used in centrifuges, and consequently, the coil, once manufactured is merely axially stretched over a shaft until the inner diameter of the coil decreases to that of the shaft, and the coil is then welded to the shaft. Also, helical conveyors which are not to be used in centrifuges are not subjected to high centrifugal forces; thus, there is no need to dynamically balance them to insure smooth operation.

The pitch of a helical conveyor for a centrifuge, however, is critical, and varies depending upon what materials are to be separated by the centrifuge. It has not been possible to utilize continuous helical coils manufactured in one of the above ways for helical conveyors for centrifuges prior to now, because the tolerances on such coils are much too large for the accuracy required for accurate fit-ups on the standard size shafts manufactured for the centrifuges. This accuracy is required, because as stated above, conveyors for centrifuges rotate at several thousand RPM, thus generating high centrifugal forces; consequently, it is important that these conveyors be dynamically balanced.

As stated above, it has not been possible to use conventionally manufactured continuous helical coils for centrifuge conveyors because the tolerances on such coils as formed are much too large. For example, if a given one of such coils were axially stretched to a predetermined pitch on a given shaft, it would be found that the radial gap between the inner periphery of the coil and the outer periphery of the shaft would be quite large, and if the coil were welded to the shaft at this pitch, the weld formed would not be as strong as the weld which would be formed with a more precisely manufactured coil. Because a helical conveyor for a centrifuge rotates at a high speed, it is important that its helical coil be strongly welded to its shaft. In addition, if the coil were not concentrically aligned on the shaft, the radial gap between the inner periphery of the coil and the outer periphery of the shaft would not be equal along the length of the coil; thus, considerable effort would have to be expended in dynamically balancing the conveyor for operation in a centrifuge.

Consequently, what is needed is an improved method for manufacturing helical conveyors for centrifuges which will utilize continuous helical coils manufactured in one of the three conventional ways discussed above so as to reduce the manufacturing costs, and one which will also produce superior conveyors.

SUMMARY OF THE INVENTION

The present invention relates to an improved method of manufacturing a helical conveyor for a centrifuge, one which utilizes a continuous helical coil as conventionally manufactured, and one which produces a superior helical conveyor.

The inner periphery of a given coil which has been manufactured by one of the conventional methods is machined (while the coil is at zero pitch) until sufficient material has been removed to increase the inner diameter of the coil to a dimension which will decrease to the diameter of a given shaft when the coil is stretched from zero pitch to a predetermined pitch.

DETAILED DESCRIPTION OF THE INVENTION

Figure 1:
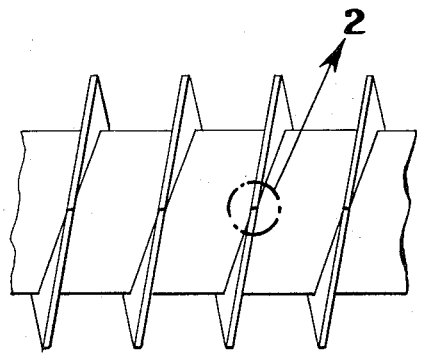
FIGS. 1 and 2 illustrate the disadvantages of utilizing the conventional methods of manufacturing helical conveyors for centrifuges.
Figure 2:
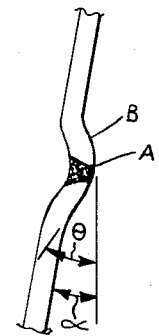
Figure 3:
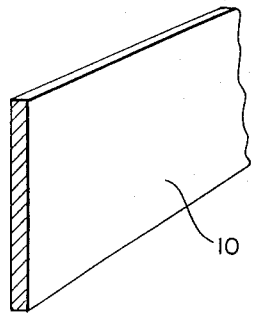
FIGS. 3 through 6 illustrate the preferred method of manufacturing a helical coil for a conveyor for a centrifuge.
Figure 4:
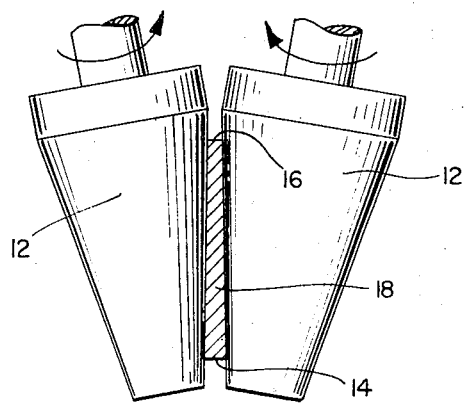
Figure 5:
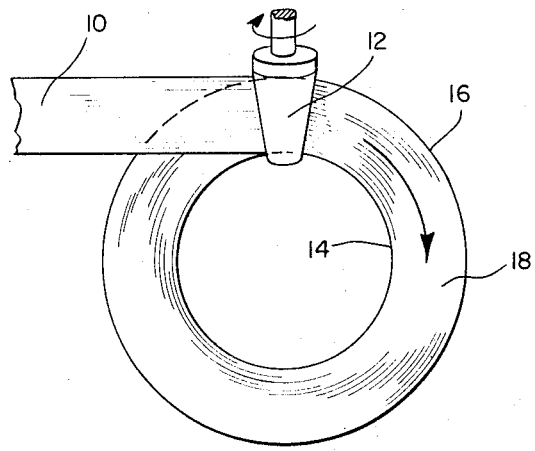
Figure 6:
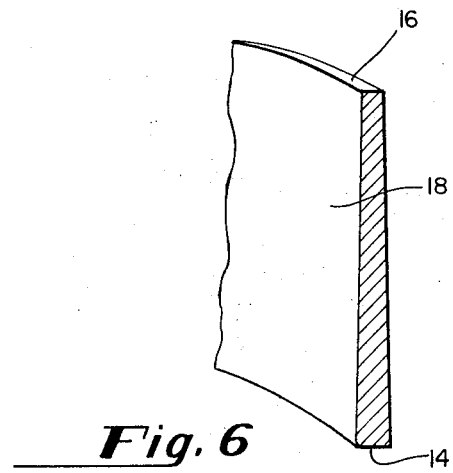

Referring to FIGS. 3 through 6, the preferred method of manufacturing a helical coil for a conveyor which is to be used in a centrifuge is illustrated in sequential steps; this is the third way of manufacturing a coil which was discussed above. A length of bar stock 10 having a rectangular cross section is illustrated in FIG. 3. To form a coil, the bar stock 10 is passed between two rotatably mounted rollers 12 so as to compress the stock in a manner such that a coil is formed, the coil being thicker at the inner periphery 14 than at the outer periphery 16. The method for manufacturing a coil in this manner is more thoroughly discussed in U.S. Pat. No. 368,569. As opposed to the other two of the three ways discussed above, this is the preferred method of manufacturing a coil for a conveyor which is to be used in a centrifuge. Although a satisfactory coil for a conveyor for a centrifuge can also be manufactured by edge rolling (discussed above), there is a problem with deformation at the inner and outer periphery of the coil as it is being formed; this is because the edges of the stock are subjected to extremely high pressures as it is being bent between the rollers. Also, when a conveyor is to be used in a centrifuge, it is preferable that it have a coil which is thicker at the inner periphery than at the outer periphery thereof, as opposed to a coil of uniform thickness, because of the relatively high centrifugal forces that the conveyor is subjected to during operation. The method illustrated in FIGS. 3 through 6 is also preferable to the first way discussed above, i.e.; manufacturing a coil by winding the bar stock with a mandral; buckling problems are encountered with the latter method because of the size of the bar stocks which must be used for the coil. As the bar stock 10 leaves the rollers 12, a helical coil 18 (FIG. 5) is formed.

However the coils are formed for the present invention, they are manufactured within predetermined tolerances. Whichever type of coiling apparatus is used, however, it produces coils which have inner diameters which are much larger than required for accurate fit-ups on the standard size shafts which are used in centrifuges; this is due to the large tolerances required by the coiling process.

Figure 7:
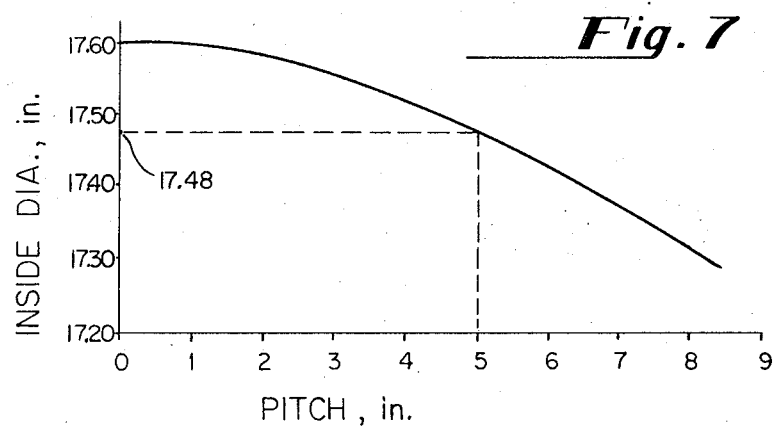
FIG. 7 illustrates a curve which shows how the inner diameter of a given coil changes when the pitch of the coil is changed.
Figure 8:
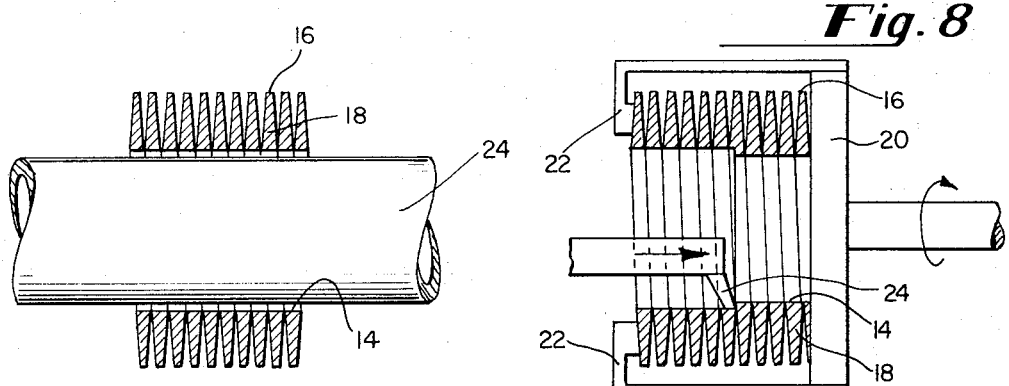
FIG. 8 illustrates the step of machining the inner periphery of a coil.
Figure 9:
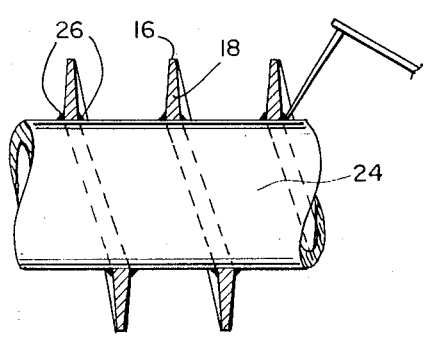
FIGS. 9 and 10 illustrate the steps of mounting and welding a coil onto a shaft, after the inner periphery of the coil has been machined.
Figures 10, 11:
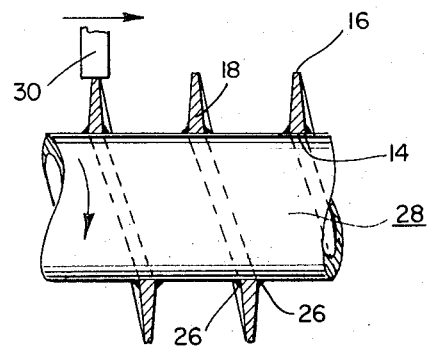
FIG. 11 illustrates the step of machining the outer periphery of a coil after the coil has been welded to a shaft.
Figure 12:
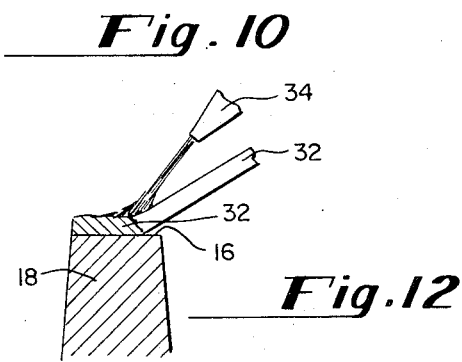
FIGS. 12 and 13 illustrate the steps of hard-surfacing the outer periphery of a coil, and grinding the hard-surfaced outer periphery.
Figure 13:
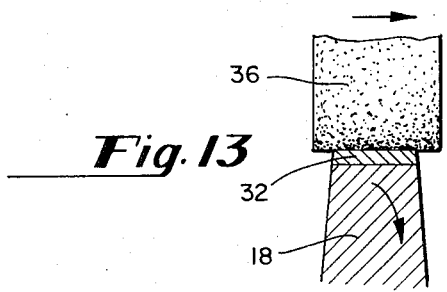

FIG. 7 illustrates a curve showing how the inside diameter of a given coil changes when the pitch of the coil is changed. Corresponding curves for other coils have substantially the same shape as the curve illustrated. Thus, if two coils having slightly different inside diameters at zero pitch, are stretched to a 5 inch pitch for example, the change in the inside diameter for each will be equal, i.e., 0.120 (FIG. 7). To give an example, assume that the diameter of a given shaft which is to be used in a centrifuge is 17.300 inches, and that the inside diameter of a given coil as formed is 17.300 inches at zero pitch (collapsed). Also, assume that this coil is to be mounted on the shaft at a 5 inch pitch. As stated above, the change in the inside diameter of a coil stretched from a zero pitch to a 5 inch pitch can be interpolated from the curve to be 0.120 inch. Thus, the inner periphery of the given coil is machined at zero pitch to remove material therefrom until the inner diameter is increased from 17.300 inches to 17.420 inches. Thus, when this coil is stretched from the zero pitch at which it was machined to the 5 inch pitch, the inner diameter will decrease from 17.420 inches to 17.300 inches, the latter dimension being the diameter of the shaft on which the coil is to be mounted. To machine the inner periphery 14 of a given coil 18, the latter is mounted against the face plate 20 of a lathe by means of clamps 22 or other means, and a cutting tool 24 is moved inwardly toward the face plate as shown; the coil is machined so that the inner periphery of the coil is concentric with the outer periphery thereof. After the inner periphery of coil 18 has been machined to the predetermined diameter, the collapsed coil is placed over a shaft 24 (FIG. 9). The coil 18 is then stretched to the predetermined pitch (5 inches in the present example), and welded to the shaft at that pitch (FIG. 10). It is noted that a weld 26 is formed along the entire length of the base of both sides of the coil 18; welding on one side, however, is also satisfactory for some applications.

After the coil 18 has been welded to the shaft 24, the helical conveyor 28 so formed, is mounted on a lathe, and a cutting tool 30 machines the outer periphery 16 of the coil so that it is concentric with the outer periphery of the shaft; the outer periphery is machined until sufficient material has been removed to decrease the outer diameter of the coil to a predetermined dimension. It is understood that the outer periphery of coil 18, may be machined at the same time that the inner periphery is machined, if desired.

After the outer periphery of coil 18 has been machined to the predetermined dimension, it is hard-surfaced by fusing a wear resistant material (e.g., stellite, carbide, etc.) 32 thereto by using a torch 34. After hard surfacing the outer periphery of coil 18, the conveyor 28 is then rotated in a lathe, and the hard-surfaced periphery is ground to a smooth finish by a rotating grinding wheel 36. The hard-surfacing step of manufacturing a conveyor for a centrifuge may not be necessary in all cases.

All machining in the present invention is held within tolerances which are typical in the centrifuge art.

I claim:

1. The method of manufacturing a helical conveyor for a centrifuge, which conveyor has a helical coil comprising a plurality of turns mounted on a shaft at a predetermined pitch, which method includes the steps of:

a. longitudinally compressing the helical coil b. machinining the inner periphery of the longitudinally comprised helical coil until sufficient material has been removed to increase the inner diameter of the coil to a precise dimension which will decrease to the exact diameter of the shaft when stretched from the pitch at which the coil was machined to the predetermined pitch;

c. placing the compressed machined coil over the shaft and longitudinally stretching the coil to the precise predetermined pitch on the shaft to reduce the inside diameter of each turn of the coil to the outside diameter of the shaft;

d. welding the coil to the shaft at the precise predetermined pitch;

e. mounting the shaft on a lathe;

f. rotating said shaft on said lathe; and g. machining the outer periphery of the coil while said shaft is rotating until sufficient material has been removed to decrease the outer diameter of the coil to an exact predetermined dimension.

2. The method of manufacturing a helical conveyor for a centrifuge according to claim 1, which further includes the step of hard-surfacing the machined outer periphery of the coil.

3. The method of manufacturing a helical conveyor for a centrifuge according to claim 2, which further includes the step of grinding the hard-surfaced outer periphery of the coil until sufficient material has been removed to decrease the outer diameter of the coil to a predetermined value.

4. The method of manufacturing a helical conveyor for a centrifuge according to claim 3, wherein the helical coil is manufactured by a method which includes the step of passing a length of bar stock between rollers so as to compress the stock in a manner that a helical coil is formed which is thicker at the inner periphery thereof than at the outer periphery thereof.

5. The method of manufacturing a helical conveyor for a centrifuge according to claim 1, wherein the helical coil is manufactured by a method which includes the step of passing a length of bar stock between rollers so as to compress the stock in a manner such that a helical coil is formed which is thicker at the inner periphery thereof than at the outer periphery thereof.

6. The method of manufacturing a helical conveyor for a centrifuge according to claim 1, which further includes the step of hard-surfacing the outer periphery of the coil.

7. The method of manufacturing a helical conveyor for a centrifuge according to claim 6, which further includes the step of grinding the hard-surfaced outer periphery of the coil until sufficient material has been removed to decrease the outer diameter of the coil to a predetermined value.

* * * * *